(12) United States Patent
Warshawsky (10) Patent No.: US 7,756,840 B2
(45) Date of Patent: Jul. 13, 2010

(54) REAL-TIME DATABASE PERFORMANCE AND AVAILABILITY MONITORING METHOD AND SYSTEM

(75) Inventor: Ron Warshawsky, Santa Clara, CA (US)

(73) Assignee: DBA InfoPower Inc., Santa Clara, CA (US)

( * ) Notice: Subject to any disclaimer, the term of this patent is extended or adjusted under 35 U.S.C. 154(b) by 713 days.

(21) Appl. No.: 11/265,244

(22) Filed: Nov. 3, 2005

(65) Prior Publication Data

US 2006/0106851 A1 May 18, 2006

Related U.S. Application Data

(60) Provisional application No. 60/624,987, filed on Nov. 3, 2004.

(51) Int. Cl.
| | |
|---|---|
| G06F 7/00 | (2006.01) |
| G06F 17/30 | (2006.01) |
| G06F 17/00 | (2006.01) |
| G06F 17/18 | (2006.01) |
| G06F 19/00 | (2006.01) |

(52) U.S. Cl. ......................... 707/688; 707/802; 702/179
(58) Field of Classification Search .................. 707/101, 707/5, 102, 999.005, 999.101, 999.102, 999.05; 701/179
See application file for complete search history.

(56) References Cited

U.S. PATENT DOCUMENTS

| | | | | |
|---|---|---|---|---|
| 5,941,820 | A * | 8/1999 | Zimmerman | ................. 600/300 |
| 6,035,306 | A * | 3/2000 | Lowenthal et al. | .......... 707/200 |
| 6,256,628 | B1 | 7/2001 | Dobson et al. | |
| 6,738,757 | B1 | 5/2004 | Wynne et al. | |
| 6,738,933 | B2 | 5/2004 | Fraenkel et al. | |
| 6,804,627 | B1 | 10/2004 | Marokhovsky et al. | |
| 6,898,556 | B2 | 5/2005 | Smocha et al. | |
| 6,910,036 | B1 | 6/2005 | Shee | |
| 6,957,396 | B2 | 10/2005 | Iwamura | |
| 7,072,863 | B1 * | 7/2006 | Phillips et al. | ............ 705/36 R |

(Continued)

OTHER PUBLICATIONS

"Lesson 2.2.1 Data Normalization" from the online syllabus for the course "Introduction to Data Mining" taught by Dr. Huan Liu, dated Dec. 14, 2003, retrieved Jun. 17, 2009 through www.archive.org from http://www.eas.asu.edu/~mining03/chap2/lesson_2_1.html, plus parent web pages http://www.eas.asu.edu/~mining03/chap2 and http://www.eas.asu.edu/~mining03/.*

(Continued)

Primary Examiner—James Trujillo
Assistant Examiner—Bruce M Moser
(74) Attorney, Agent, or Firm—Connolly Bove Lodge & Hutz LLP (57) ABSTRACT

Database performance and availability monitoring of changes impacting database performance, availability and continuity to the underlying business may be performed. A method for doing so may include analytical and visual real-time analysis engines to identify and provide alert notifications on changes in database performance statistics (such as CPU consumption, physical I/O, etc.) related to a sample period of time on a single database or across multiple databases. Result data may be displayed through a series of charts and/or summary tables that may indicate whether correlations exist between unexpected database performance and relative changes in database performance statistical parameters.

42 Claims, 4 Drawing Sheets

U.S. PATENT DOCUMENTS

| | | | |
|---|---|---|---|
| 7,249,328 B1 * | 7/2007 | Davis | 715/853 |
| 2002/0198985 A1 * | 12/2002 | Fraenkel et al. | 709/224 |
| 2003/0097438 A1 | 5/2003 | Bearden et al. | |
| 2003/0198382 A1 * | 10/2003 | Chen et al. | 382/173 |
| 2005/0172306 A1 | 8/2005 | Agarwal et al. | |
| 2006/0020924 A1 | 1/2006 | Lo et al. | |
| 2006/0031189 A1 * | 2/2006 | Muras et al. | 707/2 |
| 2006/0167704 A1 * | 7/2006 | Nicholls et al. | 705/1 |
| 2008/0177971 A1 * | 7/2008 | Prahlad et al. | 711/170 |

OTHER PUBLICATIONS

IBM Corporation, IBM DB2 Universal Database Troubleshooting Guide, Version 7, 2000.

Oracle Corporation, Oracle9i Database Performance Tuning Guide and Reference, Oct. 2002.

* cited by examiner

REAL-TIME DATABASE PERFORMANCE AND AVAILABILITY MONITORING METHOD AND SYSTEM

CROSS-REFERENCE TO RELATED APPLICATION

This application claims the priority of U.S. Provisional Patent Application No. 60/624,987, filed on Nov. 3, 2004, and incorporated herein by reference.

FIELD OF THE INVENTION

The present invention relates to databases in general, and more particularly to real time monitoring of performance and availability issues impacting databases.

BACKGROUND OF THE INVENTION

Modern database system architectures may have dozens, if not hundreds, of databases that serve multiple hundreds to thousands of business transactions per second and hundreds of thousands of data selection requests. Such systems generally suffer from exhaustion of computation resources, poor response times and lack of availability that in a very short time can endanger database continuity to underlying business functions.

A current way of addressing such issues is to use a database monitoring system that performs periodic real time data sampling of database performance statistics (for example, in case of an Oracle RDBMS these may include system statistics, wait events, latches, etc.). In some cases, formulas based on database performance statistic values are calculated and used (such as ratios, etc.).

Monitoring may be performed on one or more databases. The following three monitoring system architectures are common:

1) Database monitoring system that consists of a monitoring console to read performance sampling data directly from one or more databases (single-tier architecture);
2) Database monitoring system that consists of monitoring consoles and monitoring agents, where performance sampling data is read by monitoring agents that are deployed to every monitored database, and monitoring consoles communicate with monitoring agents to read necessary information (two-tier client-server architecture);
3) Database monitoring system that consists of monitoring consoles, monitoring server and monitoring agents, where performance sampling data is read by monitoring agents that are deployed to every monitored database, and where the monitoring server communicates with monitoring agents to read collected information and provides information input to monitoring consoles (three-tier architecture).

Database performance statistics data are analyzed by a monitoring system to identify critical conditions that endanger a database's availability to business requests. Upon identification of critical conditions, notifications are sent to interested users.

While monitoring systems described above are well known in the art, major issues arise, such as:

1) With a large number of databases to be monitored simultaneously, visual analysis of many monitoring panels is prone to errors and inefficient;
2) In many cases database problem identification based on a value of a database performance statistic reaching preset absolute thresholds is not early enough to provide a database administrator (DBA) enough time to successfully drill-down and resolve the issue;
3) Database problem identification based on a value of a database performance statistic reaching preset absolute thresholds can provide false signals, due to the changing nature of underlying business (an old absolute threshold can be too low or too high to represent accurately current database activity);
4) Many database monitoring agents may need to be deployed, maintained and reconfigured on a constant basis, and manual elements of the process are very time consuming and error prone;
5) Database performance can be impacted by negative performance of other databases (such as read-write replication clusters or functionally similar/dependent databases, databases sharing same storage, etc.), and such identification of indirect dependencies needs to be made in a short time frame to prevent negative impact on database performance.

As a result, use of existing database monitoring systems in the rapidly growing database environment is becoming unscalable.

It would, therefore, be desirable for a database monitoring architecture to be able to maintain an ability to provide early proactive identification of critical issues across multiple databases and an ability to provide a consolidate view of critical issues across multiple databases, as well as to maintain mass deployment, reconfiguration and maintenance of database monitoring agents.

BRIEF DESCRIPTION OF THE DRAWINGS

Various embodiments of the invention are described below in connection with the attached drawings, in which.

DETAILED DESCRIPTION OF EMBODIMENTS OF THE INVENTION

Figure 1:
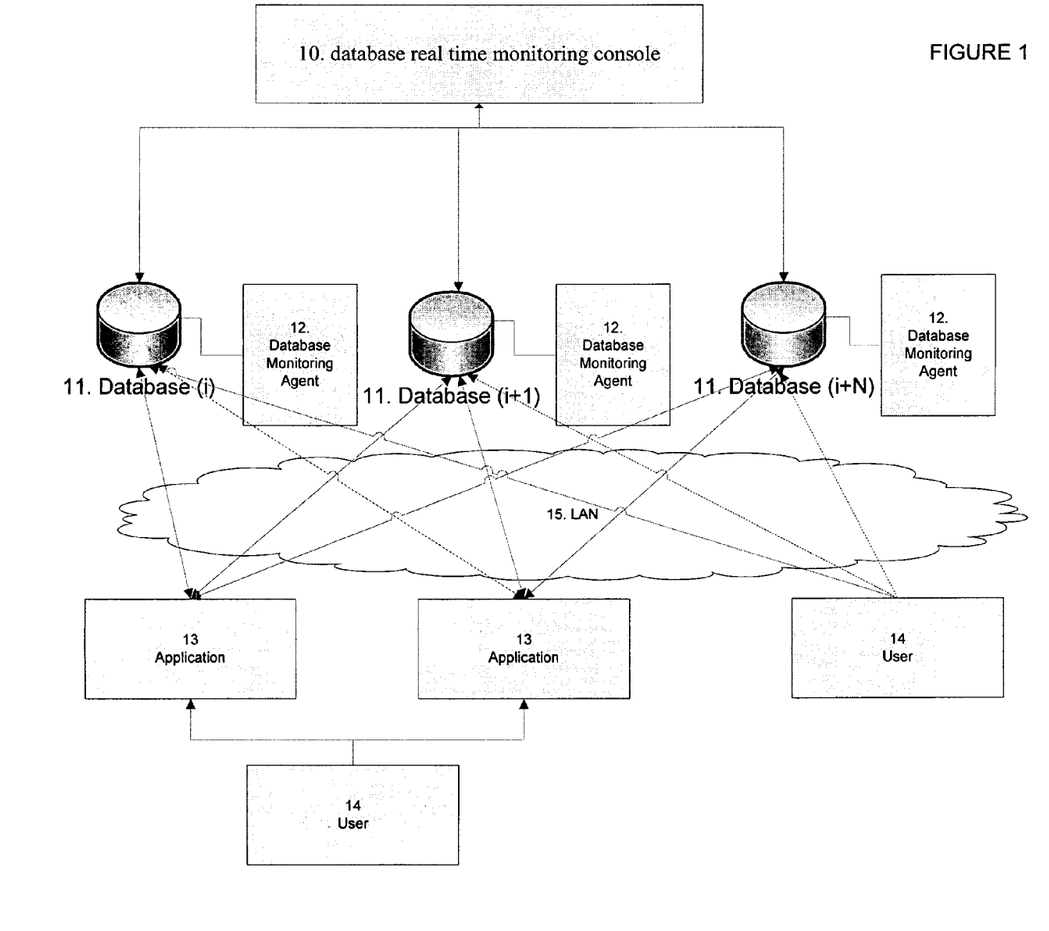
FIG. 1 is a schematic diagram of an embodiment of an overall system suitable for use in implementing the present invention.

FIG. 1 shows a typical basic system used in connection with embodiments of the present invention. As seen in FIG. 1, one or more databases are provided. Databases 11 are accessed by a number of users 14 directly or through the applications 13. Applications 13 are typically provided by third-party companies or by developers within the company that uses databases 11. Database 11 understands and executes query language (e.g., SQL) statements embedded into applications 13 or issued directly by database users 14 and, upon execution, sends requested information back to the user 14 or application 13 over the network (e.g., LAN 15).

To provide visibility for the database administrator (DBA) on database resource consumption caused by query execution, database 11 may store real time database performance statistics, for example, in the form of multiple in-memory structures, frequently externalized by database vendors in a form of virtual views (for example, Oracle uses virtual views v$sysstat and x$ksuse to externalize performance information about database system statistics). Each view contains zero to many data rows that store information on database performance statistics data counters in a structured form of one to many columns. Each column has a specific data type (for example, character or number), length and precision (appropriate for number fields). Database performance statistics data counters may be constantly incremented (e.g., starting from zero) from the moment when the database is started until the moment when the database is shutdown.

Monitoring agent 12 may use a configuration file created by a console's agent configuration module to identify database performance statistics to be collected and to create queries, for example, using SQL, that access database structures containing database performance information. Other executable elements of the configuration file can be text of SQL queries, path to server-side programs or names of database stored procedures that may be executed by the agent during runtime.

Database monitoring agent 12 may be used to constantly obtain current values of the database performance statistics, subtract them from the values of database performance statistics collected during a previous data collection period and write resulting difference data and the unique time stamp of the data collection into an output device (for example, a file or network socket). Additionally, depending on the agent configuration file, the agent may execute any aforementioned executable elements (for example, SQL, external programs or stored procedures, as discussed above). Monitoring agent 12 may be implemented in the form of hardware, software, firmware, or combinations thereof.

Embodiments of the monitoring console 10 may incorporate a user interface, a database connection configuration and agent deployment module, a database performance real-time data analysis module, a real-time data alert module, a real-time data visualization module, an alert configuration module, and/or a database monitoring agent configuration module. Monitoring console 10, including each and any of these components, may be implemented in the form of hardware, software, firmware, or combinations thereof.

The user interface, according to some embodiments of the invention, may be used to guide a user through the process of configuring connection(s) to the database(s) for real-time monitoring, deploying agents to the selected connection(s), creating and/or changing data collection configurations of the agents, setting proper alert conditions, thresholds and alert messages for notification, setting monitoring sample periods and/or configuring visualization of information of multiple monitored databases to the users.

The database connection configuration and agent deployment module may be used to obtain and record into a connection configuration file information about monitored databases. Such information may include database name, database server user name and/or password, database server side agent location and/or database software location, name of agent configuration file, database type (such as Oracle, DB2, etc.) and/or type of database server operating system (such as SunOS, Linux, etc.). Using such a database connection configuration and agent deployment module allows a user to perform such control functions as deployment of agent software on a database server, remotely starting and stopping a database monitoring agent on a database server, and connecting monitoring console to databases of choice. Database connection configuration and agent deployment module may use a SSH (secured shell) API (application programming interface) to accomplish such control functions. All control functions can be performed on multiple database connections simultaneously.

The database monitoring console may use a SSH (secured shell) API (application programming interface) to connect to a monitored database and to obtain agent configuration metadata from a monitoring agent by sending configuration a metadata request to the monitoring agent. Upon metadata information retrieval, database monitoring console may create a separate chart for every monitored database performance statistic.

The database monitoring console may use a SSH (secured shell) API (application programming interface) to connect to monitored database(s) and constantly obtain real-time data collected by database monitoring agent(s). These data may be processed by a database performance real-time data analysis and transformation module, a real-time data visualization module, and/or a real-time data alert module.

Real time data charting is a technique well known in the art and is not central to this invention. Such techniques are described widely in technical and scientific literature. However, when charted data contains large numbers of widely distributed data points, the resulting chart may be extremely hard to interpret due to the limited space of charting area (that is usually limited by the size of a physical display device) and wide distribution of the charted values. To address this issue, embodiments of the invention may provide an option of real-time calculation and charting of the moving average of the real time values of database performance statistics. This methodology may be implemented according to the formula:

$$MA(t,k)=(VAL(t-k+1)+VAL(t-k+2)+\ldots+VAL(t))/k,$$

where $MA(t,k)$ is moving average value of the data value related to corresponding time period "t", where averaging period value is k, and length of period k is greater then length of period t, i.e., k>t. Furthermore, $VAL(t)$ is a data point value in the time period t, and $VAL(t-k+1)$ is a data point value in the point of time period t−k+1, where k is the value of the averaging period, discussed above.

The above-described moving average is one example of a function of database performance statistics that may be used in some embodiments of the invention. However, the invention is not limited merely to the use of moving averages, and other functions of the database performance statistics may be used. Such functions may be predetermined or may be entered by a user.

Another issue related to real time data charting is that visual problem identification based on data only is frequently unable to provide timely identification of the significance of change in characteristics of the database performance statistics. To address this issue, embodiments of the invention may provide an option of real-time calculation and charting of a custom early identification formula, to be discussed below. An exemplary methodology that may be used to calculate values by a custom identification formula is discussed in detail with reference to FIG. 2.

Figure 2:
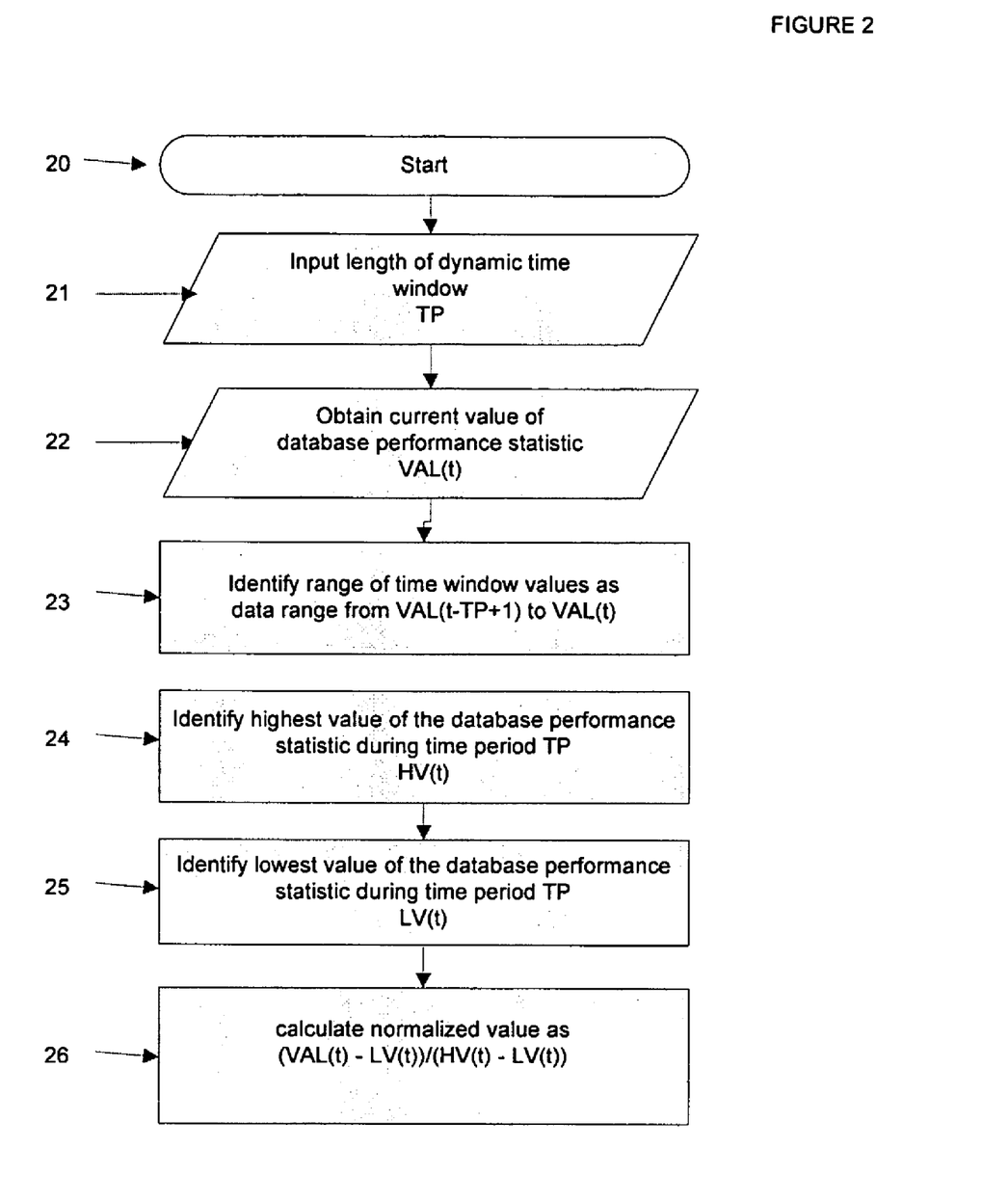
FIG. 2 is a block diagram representing steps that may be taken to calculate value of early identification, according to some embodiments of the invention.

The methodology of FIG. 2 begins by obtaining input on a size of a dynamic window time TP, where TP is a time period between a current moment of time t and a moment of time TP time units ago, t−TP+1, as shown in block 21. The process may then proceed to obtain a value of a database performance statistic in a current moment of time t, $VAL(t)$, as shown in block 22. The process may then continue by identifying a range of time window values for the database performance statistic, from $VAL(t-TP+1)$ to $VAL(t)$, as shown in block 23. The process continues by identifying the highest value of the database performance statistic within the time period from t−TP+1 to t, HV(t), as shown in block 24, and by identifying the lowest value of the database performance statistic within the same time period, LV(t), as shown in block 25. The process then calculates an early identification value EI(t) as (VAL(t)−LV(t))/(HV(t)−LV(t)), as shown in block 26, where LV(t)<=VAL(t)<=HV(t). With every newly added data item, the system may implement a forward-moving dynamic window, and may thereby recalculate the highest and lowest values within the time window and the result value of the early identification formula. Because the numerator of the above said formula is always less the denominator, the value of the formula is always normalized within the range of values from zero (0) to one (1).

By using the above formula, if a database performance statistic is constantly growing (i.e., if the current value is always the highest value within the time window), the value of the formula will be calculated as one (1), which is the highest possible value, and can provide early identification of the growing database resource consumption and potential impact on the database performance. In a similar manner, if values of the database performance statistics are constantly decreasing (i.e., if the current value is always the lowest value within the time window), the value of the formula will be calculated to be at or near zero (0), which is lowest possible value, which can indicate growing potential degradation in the database performance as well. Of course, these indications may be reversed, depending upon how the performance statistic is defined. During analysis of real time database performance statistics, such early identifications can provide a clear indication of significant changes in the characteristics and trend directions of the database performance statistics, even if changes by themselves are not initially significant and not immediately impacting performance of the underlying database.

Another embodiment of the invention related to real time database performance data visualization may provide a graphical interface allowing charting of different database performance statistics related to different databases on a common chart, wherein databases to be used and database performance statistics to be displayed may be selected by a user. The chart may include a data set display area, a vertical database performance statistic value axis, and a horizontal axis of time. The database performance statistics chart may be updated in real time upon reception of new real-time database performance data collected by a database monitoring agent.

Figure 3:
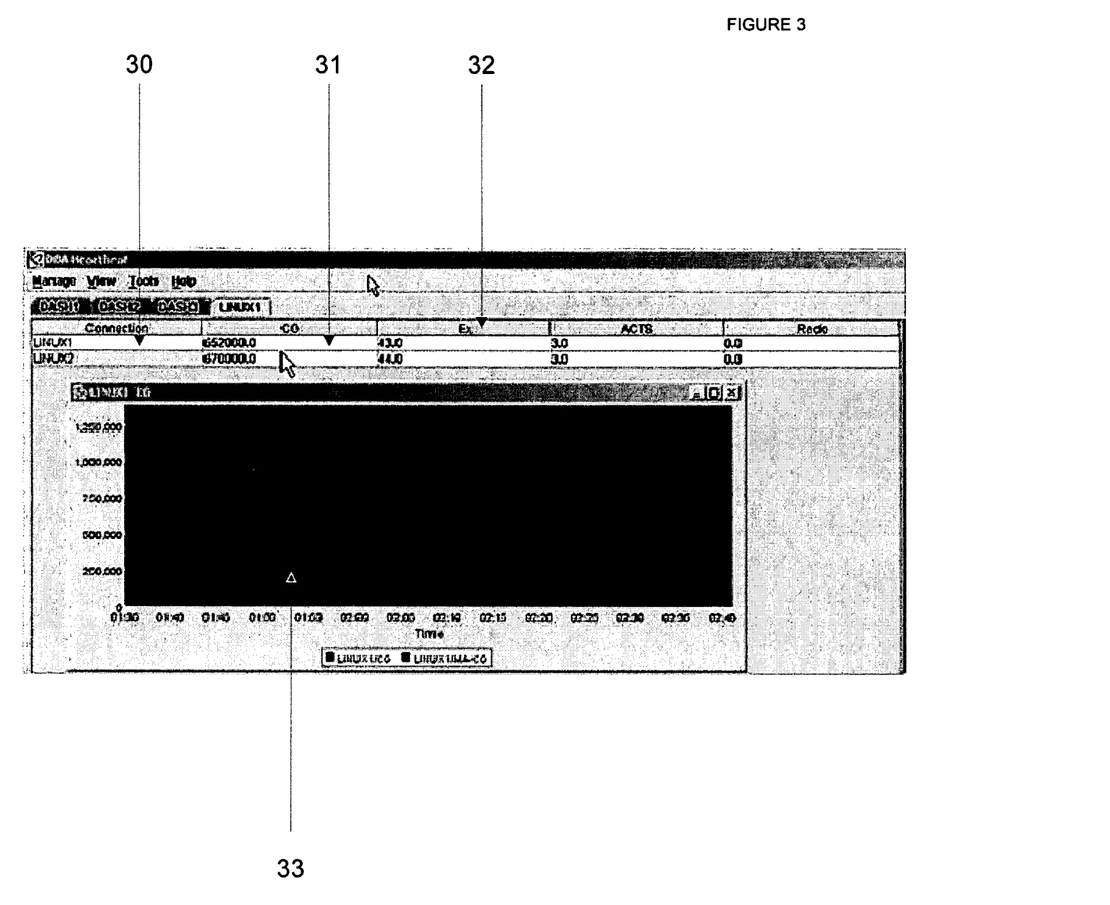
FIG. 3 is an illustration of an exemplary dashboard user interface according to some embodiments of the invention.

Another embodiment of the invention related to real time database performance data visualization may provide a graphical interface allowing efficient textual visualization of the database performance data across multiple performance statistics and/or across multiple databases on a common table/grid or dashboard, as shown in FIG. 3. The table/grid may include multiple rows, where each individual row may consist of cells 31, where individual cell may contain a current real-time value of a single database performance data statistic related to a single database, and a first cell of each row 30 may contain a name of a corresponding database connection, while a cell 32 of the table/grid header may display a name of a corresponding database performance statistic of a column. Data values in cells may be updated continuously upon reception of new real-time database performance data collected by database monitoring agents. The graphical interface may allow for changing the color of an individual cell to a user-defined or default color when a latest change of a corresponding database performance statistic triggers a monitoring alert condition. Some embodiments of the graphical interface may further change the position of the table/grid row corresponding to the related cell to be the top row of the table/grid.

In some embodiments of the graphical interface, when an individual database performance statistic cell 31 is selected by a pointing device (for example, a mouse, keypad, touch screen, etc.), the user interface may open a separate frame with a chart 33 of the selected statistic; the chart may include a data set display area, a vertical database performance statistic value axis, and a horizontal axis of time. When a table/grid header cell 32 is selected by a pointing device, the user interface may open a separate frame that contains a graphical representation 33 of the selected database performance statistic across all databases in the table/grid in the form of a single chart. When a table/grid database name cell 30 is selected by a pointing device, the user interface may open a chart 33 that contains all database performance statistics related to the selected database.

In further embodiments of the invention, the above methods may be applied to historical performance statistics data. The resulting data points may then be plotted in a chart with current data points. This may be used to compare present performance data with past performance data.

Providing alert notifications based on absolute value thresholds of real time data is a technique well known in the art and is not central to this invention. Such techniques are described widely in technical and scientific literature. However, due to the changing nature of underlying business, predefined alert thresholds may tend to become obsolete and may not provide expected levels of notification. To address this issue, embodiments of the invention may provide relative and dynamic alert thresholds and triggering conditions that will dynamically adapt to changes within the underlying database performance statistic. To address this issue, embodiments of the invention may provide options of:

setting an alert to be triggered when a current value of the database performance statistic is exceeding or falling below the value of the moving average of the database performance statistic by a user-defined or default percent value. In this case, use of percent values allows alert conditions to be independent of changing values of the underlying database performance statistics. (Note that a percent value of difference between a data point D(t) and a corresponding moving average MA(t,k) may be calculated as 100*(D(t)−MA(t,k))/MA(t,k)).

setting an alert to be triggered when a current value of the database performance statistic is exceeding or falling below a previous value of the database performance statistic by a user-defined or default percent value. In this case, use of percent values allows alert conditions to be independent of changing values of the underlying database performance statistics. (Note that a percent value of difference between two data points D(t) and D(t−1) may be calculated as 100*(D(t)−D(t−1))/D(t−1).)

setting an alert to be triggered when a current value of the aforementioned early identification formula is equal to a user-defined or default value. In this case, use of normalized data ranges that allows alert conditions to be independent from changing values of the underlying database performance statistics.

The above methodology of real time data charting and alerting can be applied to analysis of database performance statistics belonging to a single database, multiple databases, and/or physical and/or logical databases clusters, where database performance statistics related to a logical or physical cluster may be calculated as a sum of statistics across database nodes belonging to the cluster. A physical database cluster is a group of dependent database nodes (for example, a database node, in the case of DB2, or a database instance node, in the case of Oracle) functioning and working together to accomplish a single task. A logical database cluster is a group of independent database nodes that can be logically considered by a user as a virtual single database.

The monitoring agent configuration module, according to some embodiments of the invention, may be used to guide a user through the process of configuring database monitoring agent performance statistics. After obtaining user input on a type of database to be used for the creation of the monitoring agent configuration, the agent configuration module connects to the database server using a SSH (secure shell) protocol API and extracts metadata information on available database performance statistics. Based on this metadata, the user may create a custom set of database performance statistics to be monitored. Also, the user may select option to define custom action elements, for example, a query execution request, such as SQL, or to define an external program or database stored procedure to be executed by an agent during data collection cycle. The defined set of database performance statistics and custom action items is written to the agent configuration file and may be deployed to selected database servers by the database connection configuration and agent deployment module.

The alert configuration module, according to some embodiments of the invention, may be used to guide a user through the process of configuring database performance statistic alert information. After obtaining user input on a database and one or more database performance statistics associated with the corresponding database monitoring agent, a user may set monitoring thresholds, which can be high and low absolute value thresholds, high and low percent value thresholds, moving average cross-over percent threshold and/or early identification value threshold.

Figure 4:
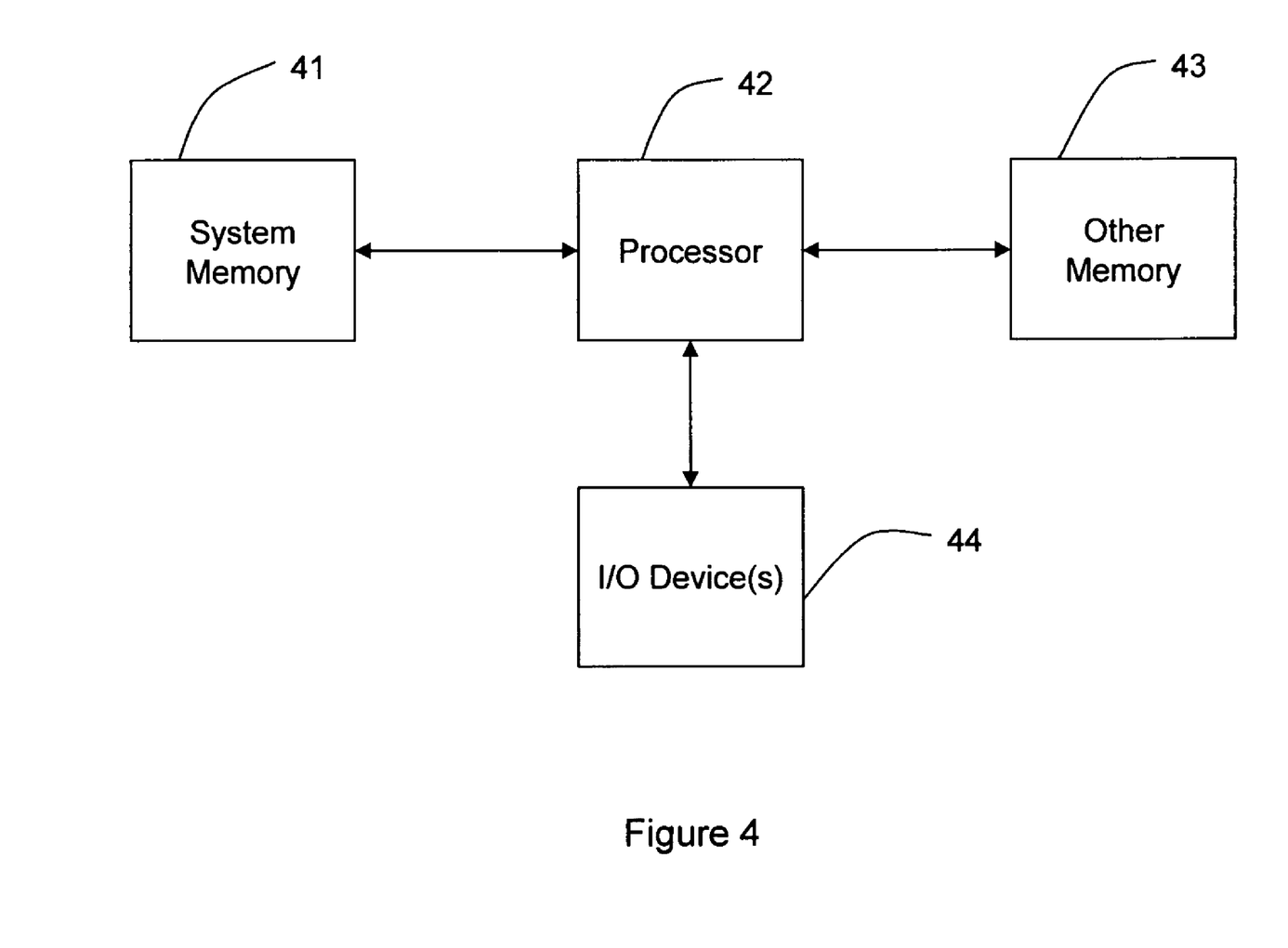
FIG. 4 is a block diagram of a system that may be used to implement some embodiments of the invention.

Some embodiments of the invention, as discussed above, may be embodied, at least in part, in the form of software instructions on a machine-accessible medium. Such an embodiment may be illustrated in FIG. 4. The computer system of FIG. 4 may include at least one processor 42, with associated system memory 41, which may store, for example, operating system software and the like. The system may further include other additional memory 43, which may, for example, include software instructions to perform various applications. System memory 41 and other memory 43 may comprise separate memory devices, a single shared memory device, or a combination of separate and shared memory devices. The system may also include one or more input/output (I/O) devices 44, for example (but not limited to), keyboard, mouse, trackball, printer, display, network connection, etc. The present invention, or parts thereof, may be embodied as software instructions that may be stored in system memory 41 or in other memory 43. Such software instructions may also be stored in removable or remote media (for example, but not limited to, compact disks, floppy disks, etc.), which may be read through an I/O device 44 (for example, but not limited to, a floppy disk drive). Furthermore, the software instructions may also be transmitted to the computer system via an I/O device 44, for example, a network connection; in such a case, a signal containing the software instructions may be considered to be a machine-accessible medium. The system of FIG. 4 may be coupled to various hardware components shown in FIG. 1.

While various embodiments of the invention have been shown and described, it will be apparent to those skilled in the art that various modifications may be made in these embodiments without departing from the spirit of the present invention. For that reason, the scope of the invention is set forth in the following claims.

What is claimed is:

1. A machine-accessible storage medium having computer-executable instructions that, upon execution by a processor, cause the processor to perform a method of database performance data processing comprising:

setting a value of a time window size TP, where TP is a time period between a current moment of time t and a moment of time TP periods ago, t−TP+1;

obtaining a value of a database performance statistic of at least one database in the current moment of time t as VAL(t);

determining a highest value of the database performance statistic of the at least one database within a time period from t−TP+1 to t, as HV(t);

determining a lowest value of the database performance statistic of the at least one database within the time period from t−TP+1 to t, as LV(t); and calculating a normalized value of a data point at time t of the at least one database as (VAL(t)−LV(t))/(HV(t)−LV(t));

determining the performance of the at least one database based on the calculated normalized value.

2. The medium of claim 1, wherein said obtaining a value of a database performance statistic comprises:

choosing VAL(t) from a database performance statistic data set, DS, comprising data elements DS(t), wherein a data element value DS(t) at time t is calculated as D(t)−D(t−1), where D(t) is a value of a database performance statistic at time t and D(t−1) is a value of the database performance statistic at a previous time, t−1;

wherein said highest value and said lowest value are determined based on said data set, DS; and wherein said normalized value at time t is calculated based on the data set DS, using VAL(t) and said highest and lowest values.

3. The medium of claim 2, having further computer-executable instructions that, upon execution by a processor, cause the processor to perform a method that further comprises:

identifying sets of data points from a set of single database performance statistics for the at least one database, wherein a corresponding time stamp value is recorded for each data point; and displaying the data points of at least one of said sets of data points on a chart, said chart comprising a data set display area, a vertical database performance statistic value axis, and a horizontal axis of time.

4. The medium of claim 2, wherein said normalized value is compared with a threshold value selected from the group consisting of: a user defined threshold value and a default threshold value.

5. The medium of claim 1, wherein said obtaining a value of a database performance statistic comprises:

setting VAL(t) equal to a function of at least one database performance statistic, wherein said highest value, said lowest value, and said normalized value are determined based on the same function of at least one database performance statistic.

6. The medium of claim 5, wherein said function comprises a moving average of a database performance statistic.

7. The medium of claim 5, having further computer-executable instructions that, upon execution by a processor, cause the processor to perform a method that further comprises:

identifying sets of data points from a set of single database performance statistics for the at least one database, wherein a corresponding time stamp value is recorded for each data point; and displaying the data points of at least one of said sets of data points on a chart, said chart comprising a data set display area, a vertical database performance statistic value axis, and a horizontal axis of time.

8. The medium according to claim 6, further comprising computer-executable instructions such that the method further comprises:

obtaining from a user a period for taking said moving average of a database performance statistic, thereby obtaining a moving average period that defines a subset of values of the database performance statistic over which the moving average is to be taken within an overall set of values;

wherein said moving average uses said moving average period.

9. The medium according to claim 6, further comprising computer-executable instructions such that the method further comprises:

computing a database performance statistic moving average period, defining a subset of values over which the moving average is to be taken, as a user defined fraction of an overall time span of underlying data values of a database parameter data set;

wherein said moving average uses said moving average period.

10. The medium of claim 5, wherein said normalized value is compared with a threshold value selected from the group consisting of: a user defined threshold value and a default threshold value.

11. The medium of claim 1, having further computer-executable instructions that, upon execution by a processor, cause the processor to perform a method that further comprises:

identifying sets of data points from a set of single database performance statistics for the at least one database, wherein a corresponding time stamp value is recorded for each data point; and displaying the data points of at least one of said sets of data points on a chart, said chart comprising a data set display area, a vertical database performance statistic value axis, and a horizontal axis of time.

12. The medium of claim 11, wherein said sets of data points correspond to a single similar statistic across the at least one database, and wherein said sets of data points are displayed on a single chart.

13. The medium according to claim 12, further comprising computer-executable instructions such that the method further comprises:

obtaining from a user a database performance statistic moving average period that defines a subset of values of the database performance statistic over which the moving average is to be taken within an overall set of values; and calculating a database performance statistic moving average data set based on the sets of data points using said moving average period.

14. The medium of claim 11, wherein said sets of data points are displayed on a single chart for a single similar statistic for a logical database cluster, wherein said logical database cluster comprises two or more physical databases.

15. The medium according to claim 14, further comprising computer-executable instructions such that the method further comprises:

obtaining from a user a database performance statistic moving average period that defines a subset of values of the database performance statistic over which the moving average is to be taken within an overall set of values; and calculating a database performance statistic moving average data set based on the sets of data points using said moving average period.

16. The medium of claim 11, wherein said sets of data points are displayed on a single chart for the at least one database performance statistics for a single physical database.

17. The medium according to claim 16, further comprising computer-executable instructions such that the method further comprises:

obtaining from a user a database performance statistic moving average period that defines a subset of values of the database performance statistic over which the movie age is to be taken within an overall set of values; and calculating a database performance statistic moving average data set based on the sets of data points using said moving average period.

18. The medium of claim 11, wherein said sets of data points are displayed on a single chart for multiple database performance statistics for a logical database cluster, wherein said logical database cluster comprises two or more physical databases.

19. The medium according to claim 18, further comprising computer-executable instructions such that the method further comprises:

obtaining from a user a database performance statistic moving average period that defines a subset of values of the database performance statistic over which the moving average is to be taken within an overall set of values; and calculating a database performance statistic moving average data set based on the sets of data points using said moving average period.

20. The medium of claim 11, further comprising additional computer-executable instructions such that the method further comprises:

calculating at least one set of data points on a same database performance statistic using data from historical time periods to thus obtain one or more sets of historical data points; and displaying said one or more sets of historical data points on said chart, along with said one or more sets of data points.

21. The medium according to claim 11, further comprising computer-executable instructions such that the method further comprises:

obtaining from a user a database performance statistic moving average period that defines a subset of values of the database performance statistic over which the moving average is to be taken within an overall set of values; and calculating a database performance statistic moving average data set based on the sets of data points using said moving average period.

22. The medium of claim 11, wherein said one or more database performance statistics are based on SQL statistics associated with one or more SQL statements executed in one or more databases.

23. The medium of claim 11, wherein said one or more database parameters are related to SQL statistics associated with one or more SQL statements executed in one or more databases.

24. The medium of claim 1, wherein said normalized value is compared with a threshold value selected from the group consisting of: a user defined threshold value and a default threshold value.

25. The medium of claim 1, wherein said obtaining a value of a database performance statistic comprises:
receiving a value of a database performance statistic from a database monitoring agent.

26. A machine-accessible storage medium having computer-executable instructions that, upon execution by a processor, cause the processor to perform a method of database performance analysis comprising:
calculating a database performance statistic moving average of at least one database based on a database performance statistic using a database performance statistic moving average period that defines a subset of values of the database performance statistic over which the moving average is to be taken within an overall set of values, wherein said database performance statistic moving average period is one of the group consisting of: a user-defined period and a predetermined default period; and
comparing a value of the database performance statistic with the value of the moving average of the at least one database to identify a percent difference between the value of the database performance statistic and the value of the moving average;
wherein said database performance statistic is selected from the group consisting of: a direct database performance statistic and a derived database performance statistic;
determining the performance of the at least one database based on the identified percent difference.

27. The medium of claim 26, wherein said method further comprises:
obtaining one or more values of said database performance statistic from at least one database monitoring agent.

28. A machine-accessible storage medium having computer-executable instructions that, upon execution by a processor, cause the processor to perform a method of database performance analysis comprising:
comparing a current value of a database performance statistic of at least one database corresponding to a current monitoring time period during which the database performance statistic was monitored with a previous value of the same database performance statistic obtained during a previous monitoring time period during which the database performance statistic was monitored to identify a percent difference between said current value and said previous value;
wherein said database performance statistic is selected from the group consisting of: a direct database performance statistic and a derived database performance statistic
determining the performance of the at least one database based on the identified percent difference.

29. The medium of claim 28, wherein said method further comprises:
obtaining one or more values of said database performance statistic from at least one database monitoring agent.

30. A method of database performance data processing comprising:
setting a value of a time window size TP, where TP is a time period between a current moment of time t and a moment of time TP periods ago, t−TP+1;
obtaining a value of a database performance statistic of at least one database in the current moment of time t as VAL(t);
determining a highest value of the database performance statistic of the at least one database within a time period from t−TP+1 to t, as HV(t);
determining a lowest value of the database performance statistic of the at least one database within the time period from t−TP+1 to t, as LV(t); and
calculating a normalized value of a data point at time t of the at least one database as (VAL(t)−LV(t))/(HV(t)−LV(t));
determining the performance of the at least one database based on the calculated normalized value.

31. The method of claim 30, wherein said obtaining a value of a database performance statistic comprises:
choosing VAL(t) from a database performance statistic data set, DS, comprising data elements DS(t), wherein a data element value DS(t) at time t is calculated as D(t)−D(t−1), where D(t) is a value of a database performance statistic at time t and D(t−1) is a value of the database performance statistic at a previous time, t−1;
wherein said highest value and said lowest value are determined based on said data set, DS; and
wherein said normalized value at time t is calculated based on the data set DS, using VAL(t) and said highest and lowest values.

32. The method of claim 30, wherein said obtaining a value of a database performance statistic comprises:
setting VAL(t) equal to a function of at least one database performance statistic, wherein said highest value, said lowest value, and said normalized value are determined based on the same function of at least one database performance statistic.

33. The method of claim 30, further comprising:
identifying sets of data points from a set of single database performance statistics for a single database, wherein a corresponding time stamp value is recorded for each data point; and
displaying the data points of at least one of said sets of data points on a chart, said chart comprising a data set display area, a vertical database performance statistic value axis, and a horizontal axis of time.

34. The method of claim 30, wherein said normalized value is compared with a threshold value selected from the group consisting of: a user defined threshold value and a default threshold value.

35. The method of claim 30, wherein said obtaining a value of a database performance statistic comprises:
receiving a value of a database performance statistic from a database monitoring agent.

36. The method of claim 30, further comprising:
downloading computer-executable instructions that, upon execution by a processor, cause the processor to perform said setting a value, said obtaining a value of a database performance statistic, said determining a highest value, said determining a lowest value, and said calculating a normalized value.

37. A method of database performance analysis comprising:
calculating a database performance statistic moving average of at least one database based on a database performance statistic using a database performance statistic moving average period that defines a subset of values of the database performance statistic over which the moving average is to be taken within an overall set of values, wherein said database performance statistic moving average period is one of the group consisting of: a user-defined period and a predetermined default period; and comparing a value of the database performance statistic with the value of the moving average of the at least one database to identify a percent difference between the value of the database performance statistic and the value of the moving average;

wherein said database performance statistic is selected from the group consisting of: a direct database performance statistic and a derived database performance statistic;

determining the performance of the at least one database based on the identified percent difference.

38. The method of claim 37, further comprising:

obtaining one or more values of said database performance statistic from at least one database monitoring agent.

39. The method of claim 37 further comprising:

downloading computer-executable instructions that, upon execution by a processor, cause the processor to perform said calculating and said comparing.

40. A method of database performance analysis comprising:

comparing a current value of a database performance statistic of at least one database corresponding to a current monitoring time period during which the database performance statistic was monitored with a previous value of the same database performance statistic obtained during a previous monitoring time period during which the database performance statistic was monitored to identify a percent difference between said current value and said previous value;

wherein said database performance statistic is selected from the group consisting of: a direct database performance statistic and a derived database performance statistic determining the performance of the at least one database based on the identified percent difference.

41. The method of claim 40, further comprising:

obtaining one or more values of said database performance statistic from at least one database monitoring agent.

42. The method of claim 40 further comprising:

downloading computer-executable instructions that, upon execution by a processor, cause the processor to perform said calculating and said comparing.

* * * * *